United States Patent Office 2,873,474
Patented Feb. 17, 1959

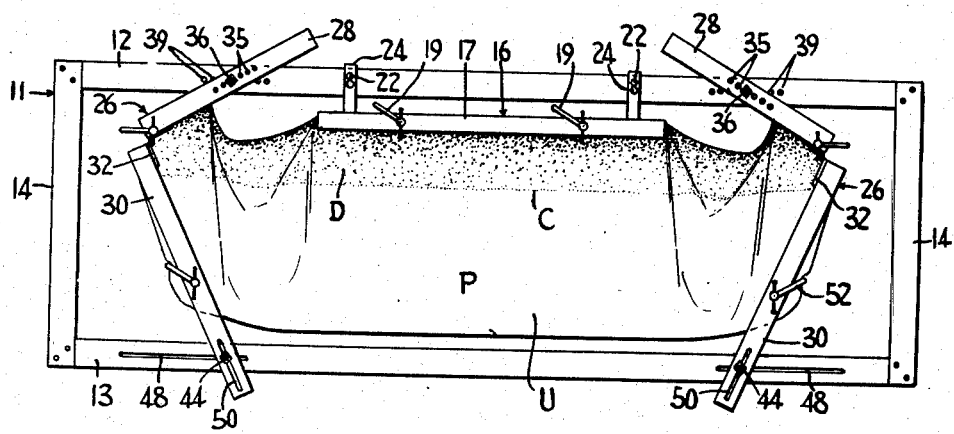
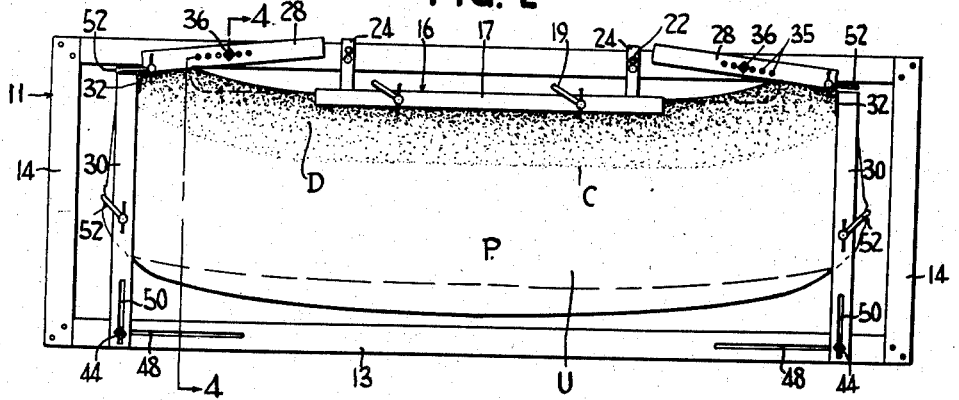
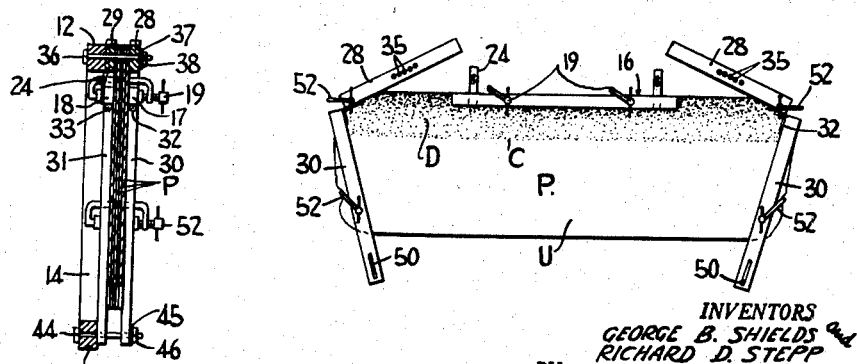

2,873,474

APPARATUS FOR STRETCHING PLASTIC INTERLAYERS

George B. Shields, New Kensington, and Richard D. Stepp, Kittanning, Pa., assignors to Pittsburgh Plate Glass Company, Allegheny County, Pa., a corporation of Pennsylvania Original application April 12, 1955, Serial No. 500,743, now Patent No. 2,817,117, dated December 24, 1957. Divided and this application April 9, 1957, Serial No. 651,755

3 Claims. (Cl. 18—1)

This invention relates to an apparatus for shaping a partially colored thermoplastic interlayer for curved laminated glass assemblies. The present invention more especially relates to an apparatus for the preparation of an interlayer which has a cut-off line between the colored band and the uncolored portion which is substantially rectilinear in the central portion and which is curved outwardly from the central portion.

In the latest models of automobiles the windshields use laminated glass assemblies which are bent along the longitudinal axis and in some of the assemblies their ends are twisted about the longitudinal axis thus producing a compound curvature. The glass assemblies each comprise two sheets of glass and a thermoplastic interlayer such as a sheet of plasticized polyvinyl butyral resin, commonly known as vinal. In these windshields the curvature along the longitudinal axis is not uniform. The curvature is greater at the end portions than at the central portion, i. e., the radius of curvature is much less at the end portions than at the central portion.

As mentioned in U. S. Patent No. 2,700,007 the necessity for a sunvisor for automobiles has been eliminated by the use of laminated windshields having an upper portion colored by means of dyeing a top marginal band of the plastic interlayer. The dye used in the band is a light-absorbing material to reduce glare from the sun. The marginal dyed band is preferably graduated in concentration of light-absorbing material with the greatest concentration of light-absorbing dye being present nearest the periphery of the thermoplastic interlayer and the dye concentration in the band diminishing gradually toward the other edge of the band until the amount at the other edge is almost imperceptible. Because the windshield in the current production of automobiles is mounted in a tilting or nonvertical fashion, a laminated glass assembly made with a thermoplastic interlayer, having a rectilinear colored band when the inlterlayer is flat, provides a cut-off point between the dyed band and the undyed portion that is nonhorizontal in appearance to a person inside the car. In order to provide an apparent horizontal cut-off line between the dyed band and the non-dyed or uncolored portion it is necessary for wrap-around windshields, which have a smaller radius of curvature at the end portions than the radius of curvature in the central portion, to use a flat thermoplastic interlayer which has a colored or dyed band having a cut-off line which is substantially rectilinear or straight in the central portion and which curves upwardly away from the central portion of the interface.

It is an object of this invention to provide an apparatus for shaping a thermoplastic interlayer having a rectilinear interface between the colored band extending across the upper portion of the interlayer and the uncolored portion of the interlayer to provide an interface which is substantially rectilinear in the central portion and curved outwardly therefrom. Other objects and advantages of the present invention will become more apparent from the following detailed description of a preferred embodiment of the apparatus and the method of using the apparatus taken in conjunction with the accompanying drawing in which like numerals are used to designate like parts throughout the same and in which:

Fig. 1 is a front elevation of the appartus of the present invention and showing thermoplastic interlayers supported by the apparatus prior to the stretching step of the method of the invention;

Fig. 2 is a front elevation of the apparatus showing the arrangement of the hinged clamps after the stretching of the interlayers and showing the shapes of the interlayers before and after heating and cooling steps of the method;

Fig. 3 is a reduced plan view of interlayers when lying in a horizontal plane and with attached top clamping bar and the side marginal hinged clamps of the invention prior to attachment of this assembly to the vertical supporting frame; and Fig. 4 is a vertical section taken along the line 4—4 of Fig. 2 with the thickness of the interlayer exaggerated for purpose of illustration.

In accordance with this invention as described in connection with the preferred embodiment a thermoplastic interlayer, i. e., a thermoplastic sheet, having a rectilinear band of light-absorbing colored material across one portion of the sheet is used. The rectilinear band is preferably a marginal portion of the sheet. Although one or more sheets or interlayers may be treated at one time by the method for using the apparatus of this invention it is preferred that with the apparatus of the preferred embodiment five sheets be treated together. The following description will be in reference to the use of five interlayers at one time although the invention is not limited thereto. The interlayers having the partially colored portions in which the colored bands are graduated are suspended vertically with the colored band of each at the top and the uncolored or nondyed portion below. The interlayers are supported at the central portion of the colored band and at the end portions of the colored band in a manner to provide intermediate sagging of the interlayers. The supported interlayers are subjected to a transverse stretch in the lower or uncolored portion. The amount of stretching is not uniform and decreases upwardly in the uncolored portion. Simultaneously with the stretching of the part of the uncolored portion the supported end portions of the colored band are raised upwardly and moved outwardly or transversely to partially reduce the intermediate sag. The interlayer while in this stretched condition is heated to remove tension stresses and to provide sag of the heated sheet. This sag produces an upward curvature in the interface between the colored band and the lower uncolored portion outwardly of the central portion while the latter maintains a substantially rectilinear or straight interface with the uncolored portion. Thereafter the sheets are cooled while the type of support is maintained and the interlayers are maintained in the stretched condition. After the stress-relieved interlayers are cooled to a lower temperature, e. g., room temperature, the support and the stretching action are no longer necessary.

In the method it is unnecessary to raise and move outwardly the end portions of the colored band simultaneously with the differential stretching of part of the uncolored portion. For example, in an alternate embodiment the interlayers can be supported centrally and at the end portions of the colored band to provide the proper amount of intermediate sag that is desired after the differential stretching of the uncolored portion. When the interlayers are thus supported, the uncolored portion of the interlayers is subjected to the differential stretching as mentioned in the next preceding paragraph. The stretched interlayers having the intermediate sags, as mentioned above, are then subjected to the heating and cooling steps as recited in the next preceding paragraph.

The apparatus for performing the foregoing method comprises a fixed frame to which is mounted a horizontal clamping bar. The clamping bar is supported by the top rail of the vertical frame and the bar is used to engage the central portion of the top margin of the interlayers. End portions of the colored band that are spaced from the central portions of the colored band are supported by hinged clamps pivotally mounted on the top rail. The hinged clamps are also slidably and pivotally mounted to the bottom rail of the frame.

Referring now to the drawing, the apparatus has a fixed frame generally indicated at 11 having top and bottom rails 12 and 13 and side rails 14. A horizontal clamping bar generally indicated at 16 comprises front and rear bars 17 and 18, as seen in Fig. 4, and cramps 19 which press bars 17 and 18 against and support the interlayers P at the central marginal portion of the colored or dyed band D. Clamping bar 16 is suspended from top rail 12 by means of pegs 22 mounted to the front face of top rail 12 and by means of slotted connecting members 24 fastened to bar 18.

Two hinged clamps generally indicated at 26 each has, as seen in Fig. 4, front and rear upper arms 28 and 29 and front and rear lower arms 30 and 31. Arms 28 and 30 are connected by hinge 32 and arms 29 and 31 are connected by hinge 33. Upper arms 28 and 29 have a series of aligned apertures 35. Hinged clamps 26 are each pivotally mounted to the front face of top rail 12 by means of bolt 36, washer 37 and nut 38 utilizing apertures 35 in arms 28 and 29 and one of the apertures 39 in top rail 12.

Bottom arms 30 and 31 are pivotally and slidably mounted to the front face of bottom rail 13 by means of bolt 44, washer 45 and nut 46. Bolt 44 passes through a longitudinal slot 48 in rail 13 and aligned longitudinal slots 50 in arms 30 and 31. Nuts 38 and 46 and bolts 36 and 44 also serve along with cramps 52 to clamp the interlayer P at the side margins of the uncolored portion U and part of colored band D adjacent cut-off line C by means of lower arms 30 and 31 and the end portions of the colored band D by means of upper arms 28 and 29.

Operation

To utilize the apparatus of this invention, bar 18 and the pair of hinged arms 29 and 31 are placed in recesses of a lay-up table (not shown) to assume the configuration shown in Fig. 3. The thickness of the offsets or recesses is that of bar 18 and arms 29 and 31 so that the top surfaces thereof are flush with the top surface of the table. Five sheets of thermoplastic interlayers each having a generally rectangular shape and having a rectilinear graduated colored band are placed on the table and positioned above bar 19 and arms 29 and 31 as indicated in Fig. 3. The pair of hinged arms 28 and 30 are placed above the sheets of interlayer P and in alignment with arms 29 and 31. Arms 28 and 29 are clamped together with the interlayers P therebetween by means of cramps 52. Similarly arms 30 and 31 are clamped together with the interlayers P therebetween by means of cramps 52. Bar 17 is placed above the central marginal portion of color band D and in alignment with bar 18. Bars 17 and 18 are clamped together with interlayers P therebetween by means of cramps 19. The resultant assembly is that shown in Fig. 3. Before moving this assembly to vertical frame 11 the distal ends of the pair of arms 28 and 29 are pressed together by means of temporary clamps (not shown). These temporary clamps are removed after pivotally mounting upper arms 28 and 29 to top rail 12.

The assembly of Fig. 3 is raised from the lay-up table and placed in a vertical position and connected to frame 11 as indicated in Fig. 1 using bolts 36 and 44 and nuts 38 and 46. It can be seen from Fig. 1 that hinged clamps 26 are mounted sufficiently close to clamping bar 16 to provide sag in the intermediate portions, that is, the portions of the interlayers between the clamping bar 16 and hinged clamps 26.

The lower portion of the uncolored portion U of interlayers P is stretched by moving the pair of arms 30 and 31 of hinged clamps 26 outwardly so that bolts 44 slide outwardly in slots 48 of rail 13. When the desired amount of stretch is provided by movement of clamp 26, nuts 46 are tightened to maintain the hinged clamp 26 in the new position thereby maintaining the desired transverse stretch of part of the uncolored portion U of interlayers P. Because upper arms 28 and 29 are mounted by bolts 36 in apertures 35 and 39, as indicated in Fig. 1, it is seen that outward movement of the pair of arms 30 and 31 produces an upward movement of the proximal end of the pair of upper arms 28 and 29. This combination of movement of the arms of hinged clamps 26 provides essentially rotation of the pair of lower arms 30 and 31 about a horizontal axis below the cut-off line C between the colored band D and the uncolored portion U of interlayers P. As a result differential stretching of the part of the uncolored portion occurs with the greatest amount of stretch being provided at the bottom margin of the uncolored portion U of interlayers P.

It is also to be noted from the new position imparted to clamps 26 that no stretching of the cut-off line is obtained. The distance between the pair of arms 30 and 31, below and adjacent the cut-off line C and above the axis of rotation, after movement to the position shown in Fig. 2 is less than the distance therebetween when originally assembled on the lay-up table. Furthermore, the amount of intermediate sag of the colored band D is reduced by the rotation of the pair of upper arms 28 and 29 which moves outwardly and upwardly the end portions of the colored band D which is pressed between arms 28 and 29. The initial clamping of the end portions by arms 28 and 29 with respect to the angle of upper arms 28 and 29 and with respect to the top margin of the colored band along with the proper choice of apertures 35 and 39 insures that the rotation of upper arms 28 and 29 will provide a slight amount of sag intermediate the end portion and central portion of the colored band D, after the bottom uncolored portion U has been differentially stretched by the movement of hinged clamps 26. The general shape of the interlayers P after the movement of hinged clamps 26 is shown by dotted lines in Fig. 2 along with the intermediate sags of the colored band D. The assembly has been prepared in a room maintained at 72° F.

The apparatus containing interlayers P in stretched condition is placed in the vertical position in an oven maintained at 220° F. The assembly is removed from the oven after 6 to 7 minutes and then allowed to cool in a vertical position at 72° F. for 45 minutes to one hour. Fig. 2 illustrates by solid lines the outline of the thermoplastic interlayers P after the heat treatment for relieving of tension stresses followed by the cooling at room temperature. As seen in Fig. 2 the heat treatment produces sagging of the interlayers P so that the bottom margin of the uncolored portion U is now curved. The sag produced by the heat treatment produces a sag in the cut-off line C below the intermediate portions of colored band D. It is also noted the central portion of the cut-off line remained rectilinear. The interlayers P at room temperature are then removed from the frame. They are cut to pattern for placing between two sheets of curved glass for the preparation of curved laminated assemblies by preliminary pressing of the assembly followed by autoclave treatment, i. e., the application of heat and pressure, in the customary manner. The foregoing temperatures and time of heating and cooling are merely illustrative and are those used in the preparation of interlayers for wrap-around windshields used in 1955 models of Packard and Nash automobiles.

The temperature can be varied widely, e. g., a temperature of 150 to 250° F. can be used. The time of heating will depend upon the temperature used and the amount of curvature of outer portions of the cut-off line desired. For example, the time will vary between 4 and 30 minutes.

The foregoing detailed description and specific example are given by way of illustration only and not by way of limitation, since various changes and modifications of the preferred embodiment are within the spirit and scope of the invention and will be apparent to those skilled in the art from this detailed description.

This application is a division of our copending application, Serial No. 500,743, filed on April 12, 1955, now U. S. Patent No. 2,817,117, granted on December 24, 1957.

We claim:

1. An apparatus for stretch forming a partially colored thermoplastic interlayer for a laminated glass assembly which comprises a rigid frame, a clamping bar, means securing the clamping bar to the top of the frame, said clamping bar being engageable with and securable to the central portion of the top margin of the interlayer, a pair of jointed clamps, means for pivotally securing the jointed clamps at their upper portion to the top of the frame and means for pivotally and slidably securing the jointed clamps at their lower portion to the bottom of the frame, said jointed clamps being engageable with and securable to the side margins of the interlayer.

2. An apparatus for stretch forming a partially colored thermoplastic interlayer for a laminated glass assembly which comprises a rigid frame, the bottom of said frame having a pair of longitudinal slots, a clamping bar secured to the top of the frame and being engageable with and securable to the central portion of the top margin of the interlayer, a pair of jointed clamps pivotally secured at their upper portion to the top of the frame and each having in its lower portion a longitudinal slot, a pair of adjustable clamping means in the longitudinal slots of the frame and the longitudinal slots of the pair of jointed clamps to pivotally and slidably secure the lower portion of the jointed clamps to the bottom of the frame, said jointed clamps being engageable with and securable to the side margins of the interlayer.

3. An apparatus for stretch forming a partially colored thermoplastic interlayer for a laminated glass assembly which comprises a rigid frame, a clamping bar being engageable with and securable to the central portion of the top margin of the interlayer, means for rigidly securing the clamping bar to the top of the frame, a first pair of clamping bars pivotally secured to the top of the frame and being engageable with and securable to at least part of the side margins of the colored portion of the interlayer, a second pair of clamping bars pivotally and slidably secured to the bottom of the frame and being engageable with and securable to at least part of the side margins of the uncolored portion of the interlayer, and hinges connecting the first pair of clamping bars to the second pair of clamping bars.

References Cited in the file of this patent

UNITED STATES PATENTS

| | | |
|---|---|---|
| 2,195,673 | Kuehne | Apr. 2, 1940 |
| 2,700,007 | Dennison et al. | Jan. 18, 1955 |